United States Patent Office 3,077,396
Patented Feb. 12, 1963

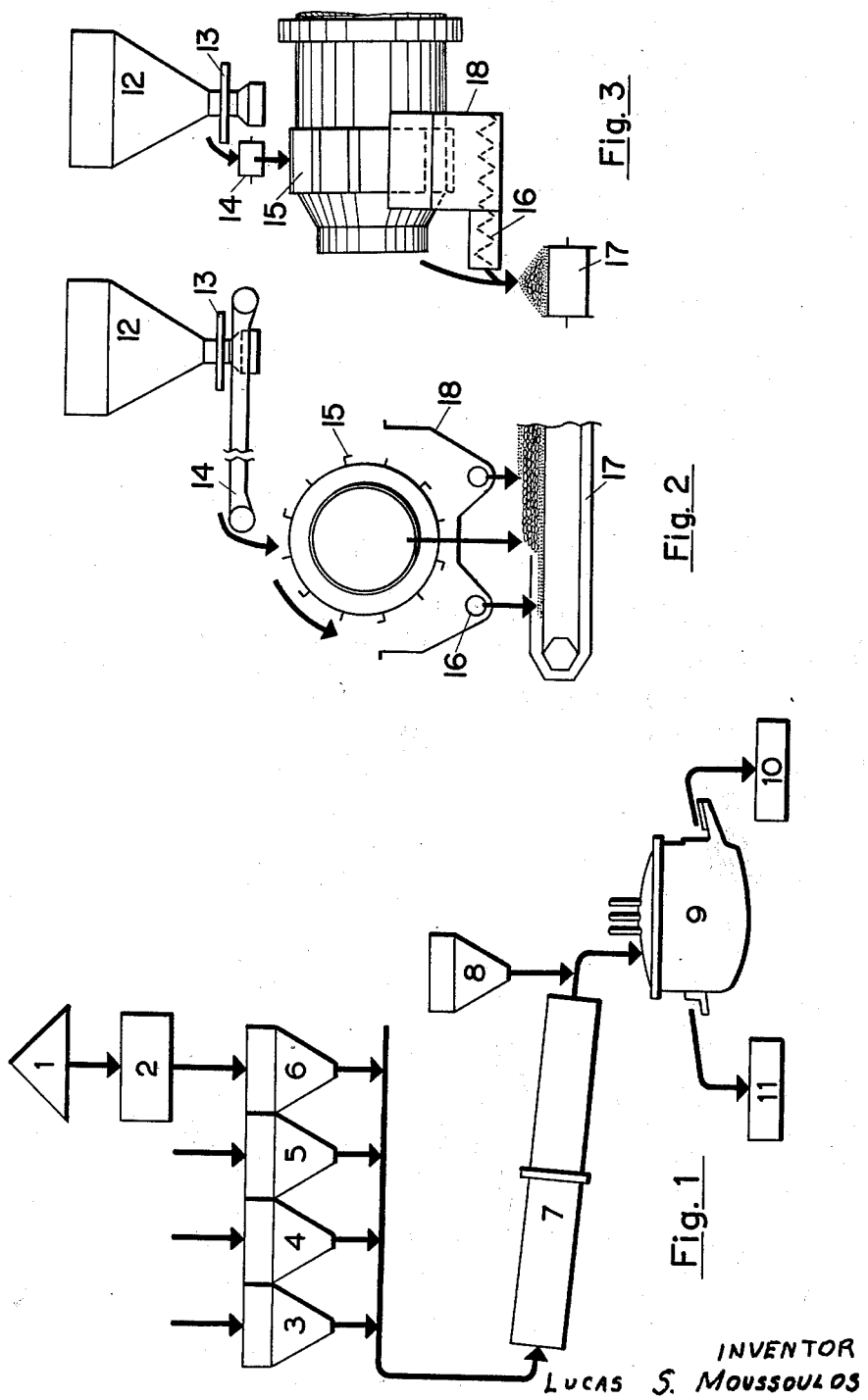

3,077,396
METHOD OF FeNi ALLOY PRODUCTION FROM NICKEL BEARING IRON ORES
Lucas S. Meussoulos, #2 Hersonos St., Athens, Greece
Filed July 10, 1959, Ser. No. 826,322
Claims priority, application Greece Aug. 9, 1958
3 Claims. (Cl. 75—31)

This invention relates to a method of extracting nickel and cobalt values from ferrous ores.

The solution of Ni in metallic iron under certain conditions, is well known in metallurgy and constitutes the basic principle of certain processes for recovering nickel from nickel bearing iron ores. Such are the Udy and Renn processes.

The latter, for example, pursues the complete reduction of the iron oxides in the ore and subsequently treats the reduced ore to produce granular and well formed iron nodules (Luppen). In these "luppen" is collected the amount of Ni and Co contained in the original ore.

The recoveries of Fe and (Ni+Co) in the Renn process are about equal, ranging between 90% and 92%. Consequently the produced nickel bearing iron "luppen" have the same (Ni+Co):(Fe+Ni+Co) ratio as the original ore.

The object of the present invention, therefore, is to upgrade the (Ni+Co):(Fe+Ni+Co) ratio, thereby obtaining a high grade ferronickel and decreasing the costs of any subsequent operations directed to winning the nickel and cobalt metals in pure form.

Another object of this invention is to provide a thermally efficient process.

Other objects and advantages of the present invention will become apparent upon further study of the specification and appended claims.

In the attached drawing FIG. 1 represents a flowsheet of the proposed method, which contains two clearly distinctive stages; and FIG. 2, a front view and FIG. 3, a side view, illustrate the method of drying and preheating of the ore added between these stages.

In this new method the ore to be processed (FIG. 1, 1), after crushing (FIG. 1, 2), is mixed as it is, or after the addition of the necessary fluxes (FIG. 1, 3 and 4) with the required amount of any conventional reduction solid fuel (FIG. 1, 5) as for instance coke breeze. The resulting mixture is charged at a steady rate to a usual rotary kiln (FIG. 1, 7), in which it is subjected to a controlled reduction treatment. By suitably adjusting the temperature and the amount of drawn air, in connection with the diameter, the length and the speed of rotation of the kiln, a part only of the contained Fe in the ore is reduced to metallic state, while the rest remains in the oxidized form ($FeO$, $Fe_3O_4$). The entirely reduced amount of Fe is obtained as fine—hard to see with the naked eye—metallic inclusions, which are scattered in the loose, incandescent material emerging from the rotary kiln.

This material which is, according to the occasion, at temperatures ranging from 900 to 1100° C., is covered upon its discharge from the rotary kiln, by a layer of crushed ore (FIG. 1, 8) with or without the addition of fluxes. This procedure considerably reduces the radiation heat losses. Such reduction of heat losses becomes more effective and results in a considerable energy economy during the subsequent treatment in the electric furnace, when the added ore and fluxes are dried and preheated, prior to their use as covering layer for the incandescent rotary kiln products. This drying and preheating operation is carried out at no cost, by a suitable arrangement such as in FIG. 2 is shown, which utilises the radiant heat at the exit end of the rotary kiln. (FIG. 2—12 bin of crushed ore, 13 feeding table, 14 conveyor, 15 exit end of the rotary kiln arranged as a drum of drying and preheating, 18 storage tank of dried and preheated ore, 16 feeding screws of the dried and preheated ore for covering the incandescent mass coming out of the rotary kiln, 17 steel plate conveyor for the transportation of the above covered mass towards the electric furnace in the case of continuous feeding.)

Further, the rotary kiln incandescent discharge, together with the added ore, is charged, either continuously or periodically, into a suitable electric furnace (FIG. 1, 9) where it is smelted in order to separate the metallic part from the remainder, obtained as slag.

Care is taken, so that the mixture fed into the electric furnace contains an insignificant amount of reduction fuel used in the rotary kiln or none at all. Under these conditions, the Ni and Co compounds are reduced by metallic iron, a large part of which is consumed for the reduction of higher iron oxides to lower ones.

The entire amount of Co+Ni in the ore treated at the rotary kiln and in the ore added on the discharged product from this kiln, is dissolved in the remaining metallic iron. Thus a rich in Ni+Co alloy (FIG. 1, 10) is obtained, which has a (Ni+Co):(Fe+Ni+Co) ratio considerably larger than the ratio of the original ore and a rich in Fe slag (FIG. 1, 11) bearing only traces of Ni is separated. Practically 100% recovery of (Ni+Co) is secured.

The ratio of concentration of the obtained alloy, can be adjusted by increasing or decreasing the amount of completely reduced iron (metallic iron) in the rotary kiln and by the amount of added ore between this kiln and the electric furnace.

One of the basic characteristics of the proposed process, is that it utilises a usual reducing agent such as coal in the rotary kiln and liquid metallic iron, as a special reducing agent in the electric furnace. Liquid iron reduces and retains only Ni and Co. The resulting abnormally high ratio of concentration of Ni+Co in the obtained alloy, is due to the fact that a part of the liquid iron is consumed for the reduction of higher iron oxides, present in the mass, to FeO.

During the reduction in the rotary kiln, the temperature is sustained at relatively low level (1000° C.), so as to avoid the reduction of phosphorus oxide. This oxide, which cannot be reduced during the subsequent treatment in the electric furnace, remains in the slag and the produced FeNi alloy is almost entirely free of this harmful element. The same holds for Cr. As regarding S, the largest part of it is carried away in the slag, by suitably adjusting the slag composition and through adequate operating procedure in the electric furnace.

The smelting operation in the electric furnace, takes place under oxidizing conditions.

This is a further reason for practically complete removal from the alloy, of carbon, silicon, manganese, phosphorus and chromium, either in the form of gases as in the case of C or in the form of oxides in the slag. The basic nature of the slag, as well as its large quantity, assists in the extensive removal of S from the alloy.

Under these condition, the Ni—Fe alloy obtained by the proposed method, in addition to its high Ni content, possesses a noteworthy degree of purity.

Regarding the economic feasibility of this method, it is interesting to note that the utilization of the heat content of the rotary kiln products and the introduction of oxygen to the electric furnace—through the addition of unreduced ore—in connection with the effected, under these conditions, fusibility and high fluidity of the slag, result in a considerable decrease in electric energy consumption. Concerning the behavior of the slag it is made clear that softening starts at 1100° C. and melting is completed at about 1350° C. Thorough settling of the metallic phase occurs at temperatures in the range of 1500 to 1550° C., and the actual smelting time is markedly short. Therefore the duration of the electric furnace stage depends largely on the procedure applied for improving the recovery and the refining.

This method can be applied to any kind of oxidized ore, such as lateritic iron ore containing Ni and or Co, as well as roasted sulfide ores. The same holds for Cu ores.

It will be understood that the invention is susceptible to modification in order to adapt it to different usages and conditions and, accordingly, it is desired to comprehend such modifications within the invention as may fall within the scope of the appended claims.

I claim:

1. A process for the production of enriched iron alloys from iron ores containing a member selected from the group consisting of nickel values, cobalt values and mixtures thereof, in addition to iron oxides, which comprises the steps of initially reducing one portion of said ore in solid form by contacting said ore with a carbonaceous reducing agent at 900–1100° C. to obtain a solid mass containing elemental iron; mixing said solid mass with a second portion of said ore in solid form; and smelting said mixture in the substantial absence of any carbonaceous reducing agent, so that the elemental iron serves as the sole reducing agent, whereby nickel and cobalt values are reduced to the elemental state and are dissolved in elemental iron, to produce high purity, high grade iron alloys.

2. The method of claim 1, wherein the iron oxide is only partially reduced in the initial step.

3. The method of claim 1, wherein the initial step is performed in a rotary kiln, and further comprising the step of heating the second portion of said ore by placing it on the outer shell of said rotary kiln prior to mixing said second portion with the solid mass containing elemental iron, thereby utilizing the heat of the initial reducing step to its fullest extent.

References Cited in the file of this patent

UNITED STATES PATENTS

| | | |
|---|---|---|
| 1,389,696 | Petinot | Sept. 6, 1921 |
| 1,717,160 | Kichline | June 11, 1929 |
| 2,039,833 | Payne | May 5, 1936 |
| 2,075,823 | Mullen et al. | Apr. 6, 1937 |
| 2,100,265 | Perrin | Nov. 23, 1937 |
| 2,221,061 | Simpson | Nov. 12, 1940 |
| 2,313,044 | Brassert | May 9, 1943 |
| 2,395,029 | Baily | Feb. 19, 1946 |
| 2,539,070 | Gebo | Jan. 23, 1951 |
| 2,573,153 | Lichty | Oct. 30, 1951 |
| 2,674,531 | Udy | Apr. 6, 1954 |
| 2,750,285 | Perrin | June 12, 1956 |
| 2,750,286 | Perrin | June 12, 1956 |
| 2,757,083 | Story | July 31, 1956 |